UNITED STATES PATENT OFFICE.

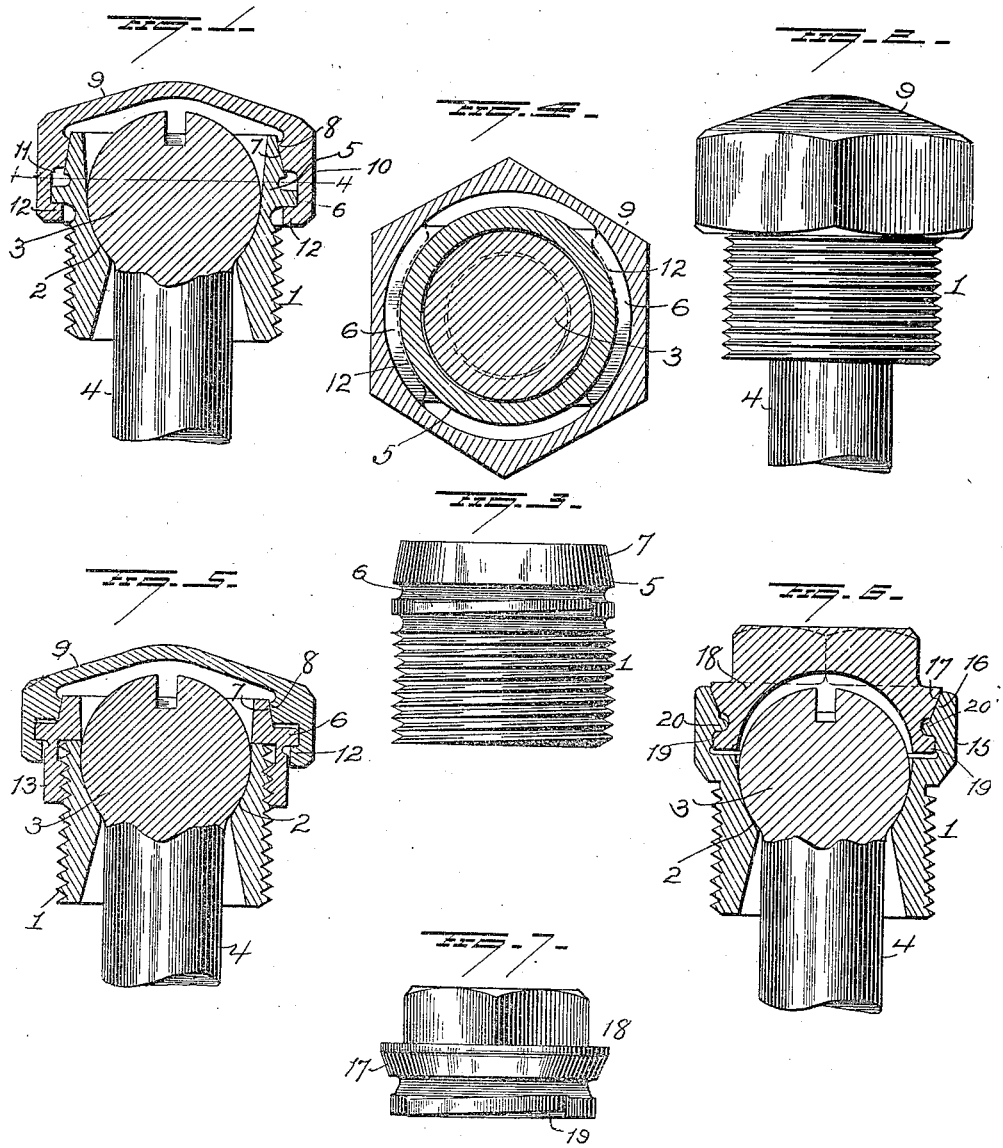

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT STRUCTURE.

1,293,634.  Specification of Letters Patent.  Patented Feb. 4, 1919.

Application filed May 3, 1918.  Serial No. 232,296.

*To all whom it may concern:*

Be it known that we, JOHN ROGERS FLANNERY and ETHAN I. DODDS, citizens of the United States, and residents of Pittsburgh, in the county of Allegheny and State of Pennsylvania, have invented certain new and useful Improvements in Stay-Bolt Structures; and we do hereby declare the following to be a full, clear, and exact description of the invention, such as will enable others skilled in the art to which it appertains to make and use the same.

This invention relates to improvements in staybolt structures for boilers, and more particularly to means for closing the outer end of the bearing sleeve,—the object of the invention being to provide simple and efficient means whereby the quick removal of the closure of the bearing sleeve can be effected to give access to the head of the bolt for testing purposes, and to so construct such devices that the closure may be quickly applied to the bearing sleeve and be normally held securely in place and effectually withstand all pressure to which the same may be subjected.

With these and other objects in view the invention consists in certain novel features of construction and combinations of parts as hereinafter set forth and pointed out in the claims.

In the accompanying drawings; Figure 1 is a sectional view of a staybolt structure showing an embodiment of our invention; Fig. 2 is a side elevation; Fig. 3 is a view in side elevation of the bearing sleeve; Fig. 4 is a transverse section on the line 4—4 of Fig. 1, and Figs. 5, 6, and 7 are views of modifications.

1 represents a bearing sleeve adapted for connection with a boiler and having an internal curved face 2 which forms a bearing for the rounded or spherical head 3 of a staybolt 4.

The bearing sleeve is made with an extension 5 at its upper end having laterally projecting inclined ribs or elongated cams 6 at diametrically opposite sides and approximately at the juncture of said extension with the body portion of the sleeve. Beyond the cam ribs 6, the extended portion 5 of the sleeve is made with a beveled peripheral face 7 which forms a seat for a beveled shoulder 8 within a cap or closure 9. This cap or closure may have a general dome shape and closes the end of the bearing sleeve and covers the head of the staybolt in a manner to effect suitable clearance of the same.

The inner face of the portion 10 of the cap which encircles the extension on the bearing sleeve, made in its inner face with recesses 11 and into these recesses the cam ribs on the bearing sleeve project. The portion 10 of the cap is provided at the inner end of its recessed portion with internal segmental shoulders 12 which, when the parts are in their normal positions, engage behind the cam ribs on the bearing sleeve.

The cap will first be so placed on the bearing sleeve that the segmental shoulders 12 of said cap will pass between the cam ribs 6 and become disposed in a plane behind the same. By now turning the cap (to facilitate which, said cap may be made with a hexagonal or other external configuration to receive a wrench), the segmental shoulders 12 in the cap will engage behind the cam ribs 6 on the bearing sleeve and said cap will, by the action of said cam ribs, be pressed tightly against its beveled seat 7 on the bearing sleeve and the segmental shoulders will be caused to bind closely against said cam ribs, thus securing the cap or closure tightly in place on the bearing sleeve. It is evident that by a partial turn of the cap in the reverse direction, it will be unclamped and may be quickly removed to expose the head of the bolt for testing purposes. The cap may be as quickly replaced and secured to the bearing sleeve as previously explained.

In the form of the invention shown in Fig. 5, the extended portion of the bearing sleeve is made as a separate part 13 which screws on the body of said bearing sleeve and provided with a shoulder 14 to overlie the outer end of the latter.

In the form of the invention shown in Fig. 6, the bearing sleeve is provided with an extension 15 having an internal beveled seat 16 to receive an external beveled shoulder 17 on the cap member 18, and said sleeve extension 15 is also provided interiorly with segmental ribs or shoulders 19 to be engaged by cam ribs 20 on the cap member 18. In this construction, the cap member enters the bearing sleeve extension instead of encircling the same and it is provided with an angular head to receive a wrench.

Having fully described our invention what we claim as new and desire to secure by Letters-Patent, is:—

1. In a staybolt structure, the combination of a bearing sleeve member provided with a beveled seat for a cap, a cap member having a beveled bearing face to engage said seat, one of said members having cam ribs or shoulders and the other member having segmental shoulders to coöperate with said cam ribs or shoulders.

2. In a staybolt structure, the combination of a bearing sleeve having an extension formed with a cap seat, said sleeve extension also having lateral cam ribs, a cap inclosing said sleeve extension and having an annular shoulder therein to engage the cap seat on the sleeve extension, and segmental ribs or shoulders in said cap to engage behind the lateral cam ribs on the bearing sleeve extension.

In testimony whereof, we have signed this specification in the presence of two subscribing witnesses.

JOHN ROGERS FLANNERY.
ETHAN I. DODDS.

Witnesses:
S. G. NOTTINGHAM,
R. S. FERGUSON.